United States Patent
Yoneda

(10) Patent No.: US 12,109,693 B2
(45) Date of Patent: Oct. 8, 2024

(54) CONTROL SYSTEM AND CONTROL METHOD

(71) Applicant: OMRON Corporation, Kyoto (JP)

(72) Inventor: Mitsuhiro Yoneda, Otsu (JP)

(73) Assignee: OMRON Corporation, Kyoto (JP)

( * ) Notice: Subject to any disclaimer, the term of this patent is extended or adjusted under 35 U.S.C. 154(b) by 581 days.

(21) Appl. No.: 17/278,321

(22) PCT Filed: Oct. 8, 2019

(86) PCT No.: PCT/JP2019/039599
§ 371 (c)(1),
(2) Date: Mar. 21, 2021

(87) PCT Pub. No.: WO2020/075699
PCT Pub. Date: Apr. 16, 2020

(65) Prior Publication Data
US 2021/0347037 A1 Nov. 11, 2021

(30) Foreign Application Priority Data
Oct. 12, 2018 (JP) .................................. 2018-193667

(51) Int. Cl.
*B25J 9/00* (2006.01)
*B25J 9/16* (2006.01)
*G05B 19/042* (2006.01)

(52) U.S. Cl.
CPC ........... *B25J 9/0084* (2013.01); *B25J 9/1664* (2013.01); *G05B 19/042* (2013.01); *G05B 2219/50391* (2013.01)

(58) Field of Classification Search
CPC ..... B25J 9/0084; B25J 9/1664; G05B 19/042; G05B 2219/50391
See application file for complete search history.

(56) References Cited

U.S. PATENT DOCUMENTS

| 5,329,450 A | 7/1994 | Onishi |
| 2006/0200254 A1* | 9/2006 | Krause ............... G05B 19/0421 700/20 |

(Continued)

FOREIGN PATENT DOCUMENTS

| CA | 2928262 | 7/2012 |
| CN | 103177334 | 6/2013 |

(Continued)

OTHER PUBLICATIONS

"Search Report of Europe Counterpart Application", issued on May 23, 2022, p. 1-p. 11.

(Continued)

*Primary Examiner* — Jaime Figueroa
*Assistant Examiner* — Jamal A Shah
(74) *Attorney, Agent, or Firm* — JCIPRNET

(57) ABSTRACT

A control system includes: a search part that, among one or more moving systems, searches for the moving system that meets preset requirements; an instruction part that outputs to a moving mechanism included in the moving system being searched an instruction for moving a second machine to be controlled included in the moving system being searched by the search part to a position operable in linkage with a first machine to be controlled; and a provision part that provides to a storage part of a second control device included in the searched moving system a linking user program for controlling the second machine to be controlled to operate in linkage with the first machine to be controlled. This makes it possible to efficiently perform dynamic recombination of the machines to be controlled.

5 Claims, 13 Drawing Sheets

(56) References Cited

U.S. PATENT DOCUMENTS

| | | | |
|---|---|---|---|
| 2016/0101940 A1 | 4/2016 | Grinnell et al. | |
| 2017/0357256 A1 | 12/2017 | Mizutani et al. | |
| 2018/0217567 A1 | 8/2018 | Suzuki | |
| 2018/0222047 A1 | 8/2018 | Nishi | |
| 2020/0230803 A1* | 7/2020 | Yamashita | B25J 9/1689 |
| 2020/0298408 A1* | 9/2020 | Hashimoto | B25J 9/1689 |

FOREIGN PATENT DOCUMENTS

| | | |
|---|---|---|
| CN | 104238487 | 12/2014 |
| CN | 107918641 | 4/2018 |
| EP | 2902862 | 8/2015 |
| JP | H1058358 | 3/1998 |
| JP | 2001121461 | 5/2001 |
| JP | 2009279608 | 12/2009 |
| JP | 2010131748 | 6/2010 |
| JP | 2014144490 | 8/2014 |
| JP | 2016215319 | 12/2016 |

OTHER PUBLICATIONS

"Office action of Europe Counterpart Application", issued on Dec. 5, 2022, pp. 1-7.

"International Search Report (Form PCT/ISA/210) of PCT/JP2019/039599," mailed on Nov. 26, 2019, with English translation thereof, pp. 1-4.

"Written Opinion of the International Searching Authority (Form PCT/ISA/237) of PCT/JP2019/039599," mailed on Nov. 26, 2019, with English translation thereof, pp. 1-10.

"Office Action of China Counterpart Application", issued on May 28, 2024, with English translation thereof, p. 1-p. 29.

Office Action of China Counterpart Application, with English translation thereof, issued on Dec. 8, 2023, pp. 1-20.

* cited by examiner

| state | moving system 10A<br>requirement 01 is at work | moving system 10B<br>under suspension | moving system 10C<br>requirement 04 is at work | moving system 10D<br>under suspension |
|---|---|---|---|---|
| requirement 01 | meet | not meet | meet | not meet |
| requirement 02 | not meet | meet | not meet | not meet |
| requirement 03 | meet | not meet | meet | not meet |
| requirement 04 | not meet | meet | meet | meet |

FIG. 12

CONTROL SYSTEM AND CONTROL METHOD

CROSS-REFERENCE TO RELATED APPLICATION

This application is a 371 application of the International PCT application serial no. PCT/JP2019/039599, filed on Oct. 8, 2019, which claims the priority benefits of Japan Patent Application No. 2018-193667, filed on Oct. 12, 2018. The entirety of each of the above-mentioned patent applications is hereby incorporated by reference herein and made a part of this specification.

BACKGROUND

Technical Field

The present invention relates to a control system including a control device which controls a machine to be controlled, and a control method of the control system.

Related Art

In various production sites, a factory automation (FA) technology using a control device such as a programmable controller (PLC) or the like is widely used. For example, Japanese Patent Laid-Open No. 10-58358 (Patent literature 1) discloses an unmanned transporting device having a self-propelled robot that performs the delivery of a product to be transported between respective processes of a manufacture line. In the unmanned transporting device, all of the self-propelled robots are notified that there is a request for unloading the product to be transported, and the self-propelled robot which responds that the notification can be handled is instructed to perform the request for unloading.

LITERATURE OF RELATED ART

Patent Literature

Patent literature 1: Japanese Patent Laid-Open No. H10-58358

SUMMARY

Problems to be Solved

In the technology of Patent literature 1, the self-propelled robots can be operated between different processes. Herein, between any processes, the operation performed by the self-propelled robot is the delivery of the product to be transported. Therefore, a user program set in the self-propelled robot is common between different processes.

In production sites, the recombination of production lines is implemented for various reasons such as a change in the production type, an increase in the production quantity, and the like. For example, a machine to be controlled may be operated on a first production line in a first period when the production quantity of the first production line is high, and the machine to be controlled may be operated on a second production line in another second period when the production quantity of the second production line is high. The machine to be controlled may perform different operations on the first and second production lines. At this time, in the first period, a first user program for operating the machine to be controlled in linkage with the machine of the first production line is set for the control device that controls the machine to be controlled. Similarly, in the second period, a second user program for operating the machine to be controlled in linkage with the machine of the second production line is set for the control device.

If both the user programs are set in the control device, the memory usage capacity of the control device is increased. Therefore, the user operates to set the first user program in the control device before the start of the first period, and set the second user program in the control device before the start of the second period. In this way, when the machine to be controlled is dynamically recombined, the time and effort for setting the user programs become complicated.

The present invention has been made in view of the above problems, and an object of the present invention is to provide a control system and a control method that can efficiently perform the dynamic recombination of the machine to be controlled.

Means to Solve Problems

According to an example of the disclosure, a control system includes: a first control device for controlling a first machine to be controlled, and one or more moving systems. Each of the one or more moving systems includes: a second machine to be controlled, a moving mechanism which moves the second machine to be controlled, and a second control device for controlling the second machine to be controlled. The second control device has: a storage part for storing a user program for controlling the second machine to be controlled, and a calculation part for executing the user program stored by the storage part. The control system further includes a search part, an instruction part, and a provision part. The search part searches, among the one or more moving systems, for the moving system that meets preset requirements. The instruction part outputs, to the moving mechanism included in the searched moving system, an instruction for moving the second machine to be controlled included in the moving system searched by the search part to a position operable in linkage with the first machine to be controlled. The provision part provides, to the storage part of the second control device included in the searched moving system, a linking user program for controlling the second machine to be controlled to operate in linkage with the first machine to be controlled.

According to the disclosure, the movement instruction is automatically output to the moving mechanism included in the searched moving system, and the linking user program is automatically provided to the control device included in the moving system. Accordingly, the time and effort of the user when dynamically recombining the machine to be controlled included in the moving system can be reduced, and the dynamic recombination of the machine to be controlled can be efficiently performed.

In the above disclosure, the linking user program includes a command for the second control device to connect to the first control device via a network.

According to the disclosure, the network can build a data link between the first control device and the second control device. The linkage between the first control device and the second control device is enhanced by the data link.

In the above disclosure, the first control device has a first timer which is time-synchronized with the first machine to be controlled. The second control device further has: a second timer which is time-synchronized with the second machine to be controlled, and an adjustment part which adjusts the second timer to be time-synchronized with the first timer when the linking user program is provided to the storage part from the provision part.

According to the disclosure, the operation of the first machine to be controlled and the operation of the second machine to be controlled can be synchronized.

In the above disclosure, the search part, the instruction part, and the provision part are included in the first control device.

Alternatively, the control system may further include a server device capable of communicating with the moving system. Besides, the instruction part and the provision part may be included in the server device.

According to an example of the disclosure, a control system includes: a first control device which controls a first machine to be controlled, and one or more moving systems. Each of the one or more moving systems includes: a second machine to be controlled, a moving mechanism which moves the second machine to be controlled, and a second control device for controlling the second machine to be controlled. The second control device has: a storage part for storing a user program for controlling the second machine to be controlled, and a calculation part for executing the user program stored by the storage part. A control method of the control system includes the following first to third steps. The first step is a step of searching, among the one or more moving systems, for the moving system that meets preset conditions. The second step is a step of outputting, to the moving mechanism, an instruction for moving the second machine to be controlled included in the searched moving system to a position operable in linkage with the first machine to be controlled. The third step is a step of providing, to the storage part of the second control device included in the searched moving system, a linking user program for controlling the second machine to be controlled to operate in linkage with the first machine to be controlled.

According to the disclosure, the time and effort of the user when dynamically recombining the machine to be controlled included in the moving system can also be reduced, and the dynamic recombination of the machine to be controlled can also be efficiently performed.

Effect

According to the present invention, the dynamic recombination of the machine to be controlled can be efficiently performed.

BRIEF DESCRIPTION OF THE DRAWINGS

FIG. 12 is a diagram showing an example of a requirement table stored by a server device according to Variation example 4.

DESCRIPTION OF THE EMBODIMENTS

Hereinafter, embodiments according to the present invention are described with reference to the drawings. In the following descriptions, the same components and constituent elements are marked with the same signs. Names and functions of the same components and constituent elements are also the same. Thus, detailed descriptions of the same components and constituent elements are not repeated.

§ 1 Application Example

Figure 1:
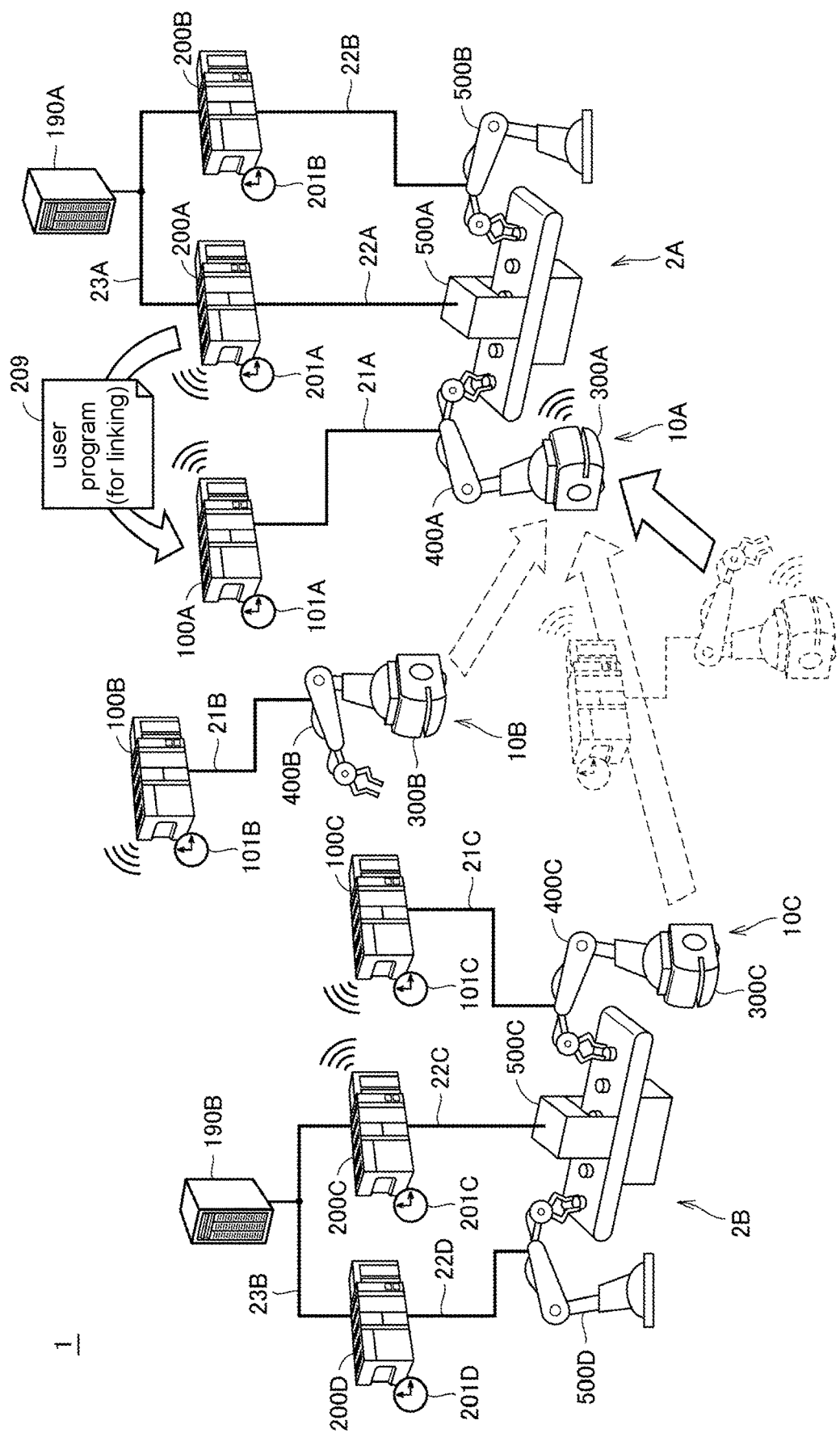
FIG. 1 is a diagram schematically showing an outline of a control system according to an embodiment.

Firstly, an example of a scene in which the present invention is applied is described with reference to FIG. 1. FIG. 1 is a diagram schematically showing an outline of a control system according to an embodiment.

As shown in FIG. 1, a control system 1 according to the embodiment includes control devices 200A to 200D and moving systems 10A to 10C.

The control devices 200A to 200D control field machines that are machines to be controlled. Specifically, the control devices 200A to 200D are respectively connected to field machines 500A to 500D via field networks 22A to 22D, and control the field machines 500A to 500D. Moreover, the number of the field machines connected to each of the control devices 200A to 200D is not limited to one and may be plural. A field machine 500 includes, for example, a sensor, an actuator, and the like.

Each of the control devices 200A to 200D executes Input/Output (IO) refresh processing, user program execution processing, motion processing, and the like for each control period.

The IO refresh processing is processing of transmitting and receiving data between the control devices and the field machines via the field networks.

The user program execution processing is processing of executing a user program which is an application program arbitrarily created according to an object to be controlled.

The motion processing is processing of calculating numerical values of a position, a speed, an acceleration, a jerk, an angle, an angular speed, an angular acceleration, an angular jerk, and the like as instructions for an actuator such as a servo motor or the like included in the field machine.

The control devices 200A to 200D respectively have timers 201A to 201D that are time-synchronized with the field machines to be connected. The control devices 200A to 200D respectively execute the IO refresh processing, the user program execution processing, the motion processing, and the like according to the time of the timers 201A to 201D.

The field machine 500A controlled by the control device 200A and the field machine 500B controlled by the control device 200B are fixedly installed on a production line 2A and perform processing for workpieces transported on the production line 2A.

The control device 200A and the control device 200B are connected to a network 23A of a control level. A management device 190A is connected to the network 23A. The network 23A builds data links between the control devices 200A and 200B and the management device 190A. By the data links, the management device 190A can manage a link operation of the field machine 500A controlled by the control device 200A and the field machine 500B controlled by the control device 200B. Moreover, if necessary, the timer 201A included in the control device 200A and the timer 201B included in the control device 200B are time-synchronized with each other.

The field machine 500C controlled by the control device 200C and the field machine 500D controlled by the control device 200D are fixedly installed on a production line 2B and perform processing to workpieces transported on the production line 2B.

The control device 200C and the control device 200D are connected to a network 23B of the control level. A management device 190B is connected to the network 23B. The network 23B builds data links between the control devices 200C and 200D and the management device 190B. By the data links, the management device 190B can manage the link operation of the field machine 500C controlled by the control device 200C and the field machine 500D controlled by the control device 200D. Moreover, if necessary, the timer 201C included in the control device 200C and the timer 201D included in the control device 200D are time-synchronized with each other.

The moving systems 10A to 10C are systems that can move between a plurality of production lines including the production lines 2A and 2B. The moving systems 10A to 10C respectively include control devices 100A to 100C, field machines 400A to 400C, and moving mechanisms 300A to 300C.

The field machines 400A to 400C are, for example, robot arms including sensors, actuators, and the like, and perform some processing on the workpieces on the production lines.

The moving mechanisms 300A to 300C are configured by, for example, autonomous traveling robots, and respectively move the field machines 400A to 400C.

The control devices 100A to 100C respectively control the field machines 400A to 400C which are machines to be controlled. Specifically, the control devices 100A to 100C are respectively connected to the field machines 400A to 400C via field networks 21A to 21C and control the field machines 400A to 400C. Moreover, the number of the field machines connected to each of the control devices 100A to 100C is not limited to one and may be plural.

Similar to the control devices 200A to 200D, each of the control devices 100A to 100C executes the IO refresh processing, the user program execution processing, the motion processing, and the like for each control period. Each of the control devices 100A to 100C previously stores the user program arbitrarily created according to an object to be controlled in order to execute the user program execution processing.

The control devices 100A to 100C respectively have timers 101A to 101C that are time-synchronized with the field machines to be connected. The control devices 100A to 100C respectively execute the IO refresh processing, the user program execution processing, the motion processing, and the like according to the time of the timers 101A to 101C.

In the control system 1, the moving systems 10A to 10C move according to the production quantity of each production line, and thereby the dynamic recombination of the field machine constituting each production line is performed.

Each of the field machines 500A and 500C respectively connected to the control devices 200A and 200C has, for example, a sensor which measures the number of unprocessed workpieces on the corresponding production line. Each of the control devices 200A and 200C periodically collects the measurement result of the corresponding sensor and grasps the number of the unprocessed workpieces. Each of the control devices 200A and 200C determines that production support by the moving systems is necessary when the number of the unprocessed workpieces exceeds a preset threshold value, and performs the following processing. Moreover, hereinafter, the control device 200A determines that the production support by the moving systems is necessary.

The control device 200A searches for the moving system that meets preset requirements among the moving systems 10A to 10C. The preset requirements are requirements that are necessary during the operation on the production line 2A. In the example shown in FIG. 1, the moving system 10A is searched as the moving system that meets preset requirements.

The control device 200A outputs, to the moving mechanism 300A included in the moving system 10A, an instruction for moving the field machine 400A included in the searched moving system 10A to a position operable in linkage with the field machine 500A (hereinafter referred to as "movement instruction"). Accordingly, the moving mechanism 300A moves according to the movement instruction. As a result, the field machine 400A moves to a position operable in linkage with the field machine 500A.

Here, the forms in which the plurality of field machines are "linked" and operated mainly include the following three forms (1) to (3).

(1) A form in which the plurality of field machines simultaneously perform processing on the same workpiece (simultaneous processing).

(2) A form in which the plurality of field machines sequentially perform processing on the same workpiece (series processing).

(3) A form in which the plurality of field machines respectively perform processing on a plurality of workpieces of the same type (parallel processing).

The operation of the field machine 400A linked with the field machine 500A on the production line 2A is different from the operation of the field machine 400A linked with the field machine 500C on the production line 2B. Therefore, the control device 200A provides, to the control device 100A included in the searched moving system 10A, a user program (linking user program) 209 for controlling the field machine 400A to operate in linkage with the field machine 500A. Accordingly, the control device 100A executes the user program 209 provided from the control device 200A, and thereby the field machine 400A can be operated in linkage with the field machine 500A on the production line 2A.

In this way, in the control system 1 of the embodiment, the movement instruction is automatically output to the moving mechanism included in the searched moving system, and the linking user program is automatically provided to the control device included in the moving system. Accordingly, the time and effort of the user when dynamically recombining the field machine included in the moving system are reduced. That is, according to the control system 1 of the embodiment, the dynamic recombination of the field machine can be efficiently performed.

§ 2 Configuration Example

Embodiments of the present invention are described in detail with reference to the drawings. In the following descriptions, a programmable logic controller (PLC) is described in detail as a typical example of the "control device", but the technical ideas disclosed in the specification can be applied to any control device without being limited to the name of PLC.

Moreover, hereinafter, when the moving systems 10A to 10C are not particularly distinguished, each of the moving systems 10A to 10C is referred to as a "moving system 10". When the control devices 100A to 100C are not particularly distinguished, each of the control devices 100A to 100C is referred to as a "control device 100". When the field networks 21A to 21C are not particularly distinguished, each of the field networks 21A to 21C is referred to as a "field network 21". When the field machines 400A to 400C are not particularly distinguished, each of the field machines 400A to 400C is referred to as a "field machine 400". When the moving mechanisms 300A to 300C are not particularly distinguished, each of the moving mechanisms 300A to 300C is referred to as a "moving mechanism 300". When the control devices 200A to 200D are not particularly distinguished, each of the control devices 200A to 200D is referred to as a "control device 200". When the field networks 22A to 22D are not particularly distinguished, each of the field networks 22A to 22D is referred to as a "field network 22". When the field machines 500A to 500D are not particularly distinguished, each of the field machines 500A to 500D is referred to as a "field machine 500". When the networks 23A and 23B are not particularly distinguished, each of the networks 23A and 23B is referred to as a "network 23". When the management devices 190A and 190B are not particularly distinguished, each of the management devices 190A and 190B is referred to as a "management device 190".

<A. Example of Hardware Configurations of Control Device 100 and Field Machine 400>

Next, the hardware configurations of the control device 100 (100A to 100C) and the field machine 400 (400A to 400C) constituting the moving system 10 according to the embodiment are described.

Figure 2:
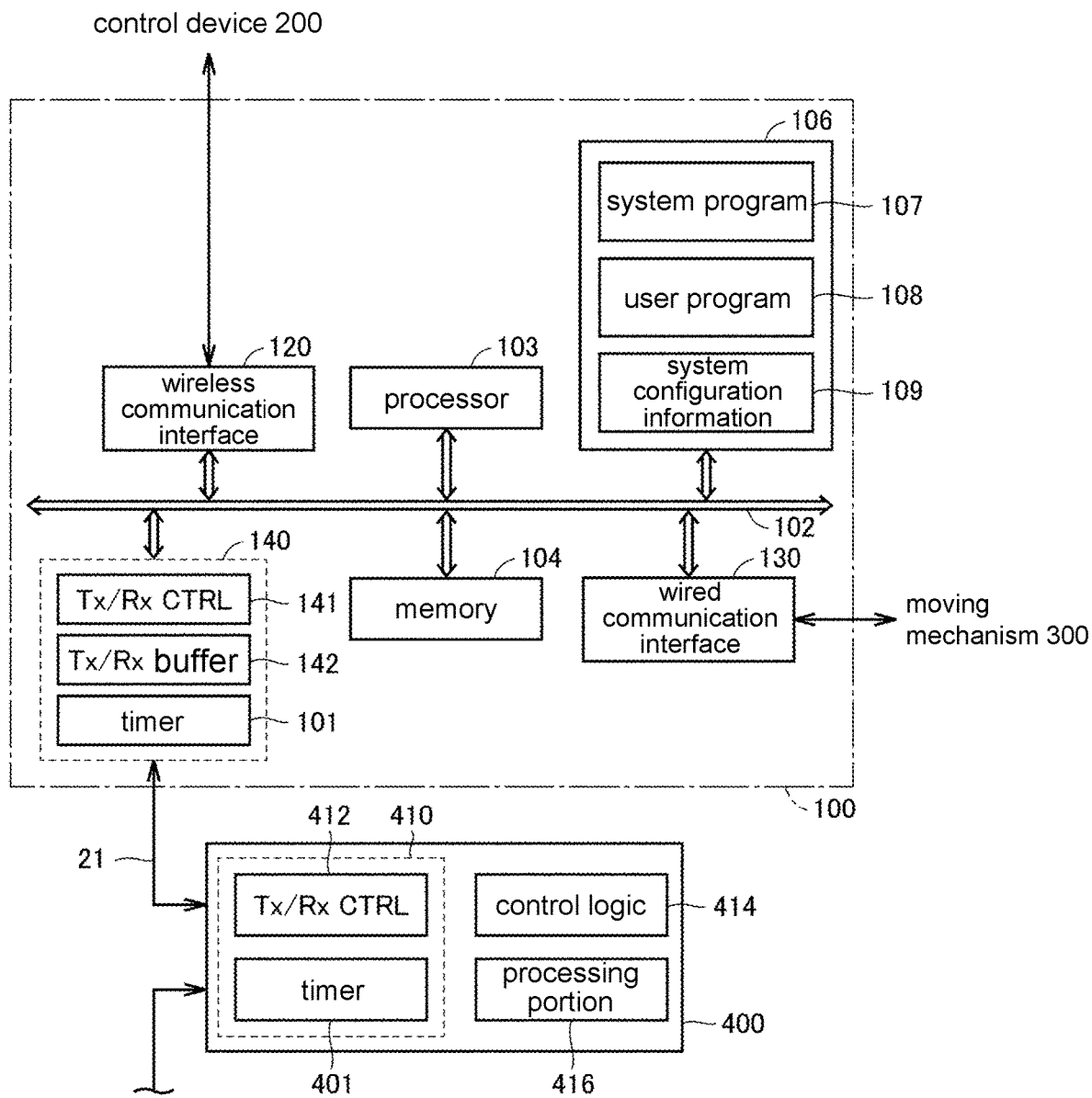
FIG. 2 is a block diagram showing an example of the hardware configurations of a control device and a field machine constituting a moving system according to the embodiment.

FIG. 2 is a block diagram showing an example of the hardware configurations of the control device and the field machine constituting the moving system according to the embodiment. The control device 100 may typically be configured on the basis of a programmable controller (PLC). The control device 100 is respectively operated as a master that manages data transmission of the field network 21. The field machine 400 is operated as a slave that performs data transmission according to an instruction from the corresponding master.

With reference to FIG. 2, the control device 100 includes, as main components, a processor 103, a memory 104, a storage 106, a wireless communication interface 120, a wired communication interface 130, and a field network controller 140. These components included in the control device 100 are communicably connected to each other via internal buses 102.

The processor 103 realizes various kinds of processing by reading and executing a system program 107 and a user program 108 stored in the storage 106. The memory 104 includes a volatile storage device such as a dynamic random access memory (DRAM), a static random access memory (SRAM), or the like.

The storage 106 stores the user program 108 designed according to an object to be controlled and the like, in addition to the system program 107 for controlling each portion of the control device 100.

Furthermore, the storage 106 stores information indicating the configuration (system configuration) of the moving system 10 to which the control device 100 belongs (system configuration information 109). For example, the system configuration information 109 is information indicating the network configuration of the field machine 400 connected to the control device 100, the control period of the control device 100, an upper limit value of the storage region capacity for the user program 108 in the storage 106, the model and version information of the control device 100, the performance and model of the field machine 400 connected to the control device 100, and the like.

The wireless communication interface 120 controls the exchange of data through a wireless network. The wireless communication interface 120 of the embodiment controls the exchange of data with the control device 200.

The wired communication interface 130 controls the exchange of data through a wired network. The wired communication interface 130 of the embodiment controls the exchange of data with the moving mechanism 300.

The field network controller 140 provides an interface for the control device 100 to exchange data with the field machine 400 via the field network 21. As a protocol of the field network 21, EtherCAT (registered trademark) which is an example of a machine control network may be used.

The field network controller 140 includes, as main components, a transmission/reception controller 141, a transmission/reception buffer 142, and a timer 101.

The timer 101 is any one of the timers 101A to 101C shown in FIG. 1.

The transmission/reception controller 141 performs processing related to generation and reception of packets transmitted on the field network 21 for each control period. Specifically, the transmission/reception controller 141 writes the data stored in the packets received from the field network 21 to the transmission/reception buffer 142. The transmission/reception controller 141 sequentially reads the received packets written in the transmission/reception buffer 142, and outputs, to the processor 103, only the data necessary for processing in the control device 100 among the read data. The transmission/reception controller 141 sequentially writes data or packets to be transmitted to the field machine 400 to the transmission/reception buffer 142 according to an instruction from the processor 103. The data stored in the transmission/reception buffer 142 is sequentially transmitted on the field network controller 140 according to a period in which the packets are transferred.

The timer 101 generates a pulse which is a reference of the timing for indicating data transmission or the like from the transmission/reception controller 141. As the timer 101, a real-time clock or a free-run counter that counts up (increments) at a predetermined period can be used. The current time can be calculated by treating a count value output by the free-run counter as the elapsed time from a time point, and thus the free-run counter can be operated as a timer.

The field machine 400 performs processing on an object to be controlled such as a mechanism, equipment, or the like according to the control by the control device 100. Typically, the field machine 400 performs collection processing of field information from the object to be controlled, output processing of an instruction signal to the object to be controlled, and the like. The field machine 400 includes, as main components, a field network controller 410, a control logic 414 for managing data transfer on the field network 21, and a processing portion 416.

The field network controller 410 provides an interface for the field machine 400 to transmit and receive data to/from the control device 100 via the field network 21. The field network controller 410 includes, as main components, a transmission/reception controller 412 and a timer 401.

The transmission/reception controller 412 performs data writing and data reading for a communication frame transferred on the field network 21.

The timer 401 generates a clock which is a reference of the timing of instruction output to the transmission/reception controller 412, processing execution by the field machine 400, or the like. As the timer 401, a real-time clock or a free-run counter is used. The timer 401 takes the timer 101 as a master and is time-synchronized with the timer 101.

The processing portion 416 performs processing on the object to be controlled. For example, when the object to be controlled is a servo motor, the processing portion 416 generates a command for the servo motor based on an instruction from the control device 100, and operates the servo motor according to the generated command. Furthermore, an encoder is arranged on a rotational shaft of the servo motor, and the processing portion 416 collects field information such as a position (a rotational angle), a rotational speed, and a cumulative rotational number of the servo motor from the encoder.

B. Example of Hardware Configuration of Moving Mechanism 300

Next, the hardware configuration of the moving mechanism 300 (300A to 300C) constituting the moving system 10 according to the embodiment is described.

Figure 3:
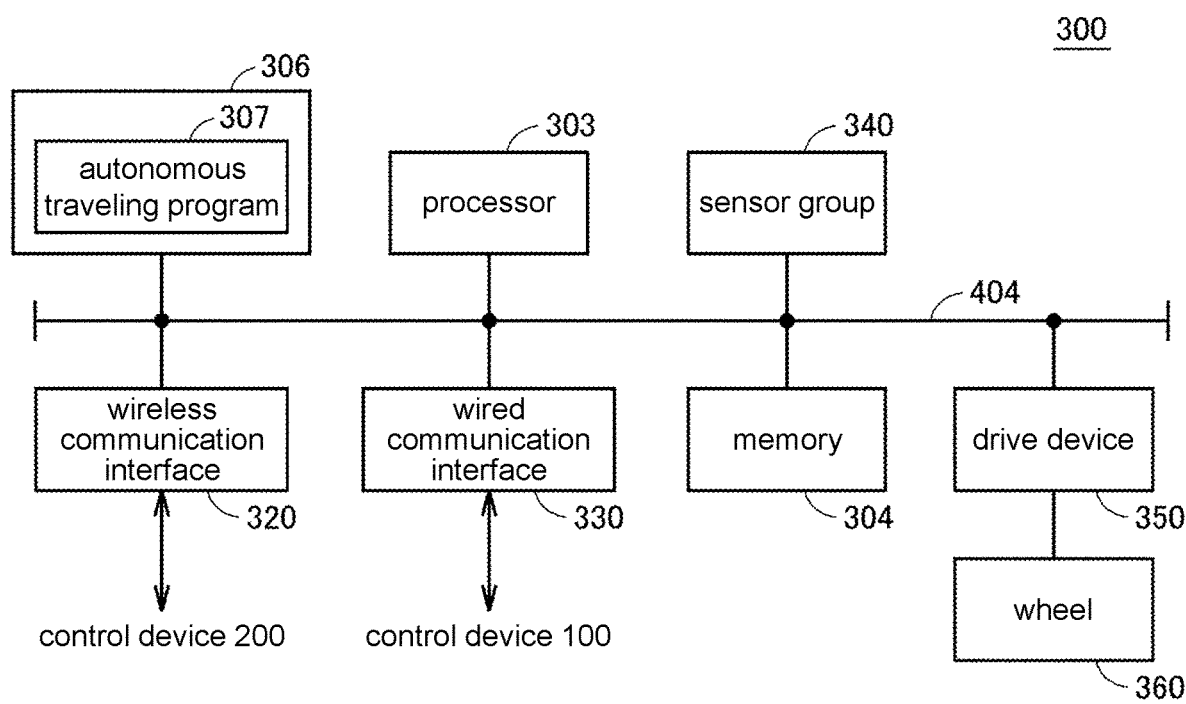
FIG. 3 is a block diagram showing an example of the hardware configuration of a moving mechanism constituting the moving system according to the embodiment.

FIG. 3 is a block diagram showing an example of the hardware configuration of the moving mechanism constituting the moving system according to the embodiment. With reference to FIG. 3, the moving mechanism 300 includes, as main components, a processor 303, a memory 304, a storage 306, a wireless communication interface 320, a wired communication interface 330, a sensor group 340, and a drive device 350. These components included in the moving mechanism 300 are communicably connected to each other via internal buses 302.

The processor 303 realizes various kinds of processing by reading and executing various programs stored in the storage 306. The memory 304 includes a volatile storage device such as a DRAM, a SRAM, or the like. In the storage 306, an autonomous traveling program 307 for performing autonomous traveling is stored.

The wireless communication interface 320 controls the exchange of data through the wireless network. The wireless communication interface 320 of the embodiment controls the exchange of data with the control device 200.

The wired communication interface 330 controls the exchange of data through the wired network. The wired communication interface 330 of the embodiment controls the exchange of data with the control device 100.

The sensor group 340 includes various sensors such as a sensor for specifying the current position of the moving mechanism 300 (for example, a laser scanner, a global positioning system (GPS) sensor, or the like), a laser sensor for detecting an obstacle around the moving mechanism 300, a contact sensor that detects the contact with an object, and the like.

The drive device 350 is a device for driving a wheel 360, and includes an actuator such as a motor or the like.

C. Example of Hardware Configurations of Control Device 200 and Field Machine 500

Next, the hardware configurations of the control device 200 (200A to 200D) and the field machine 500 (500A to 500D) fixedly installed on the production line are described.

Figure 4:
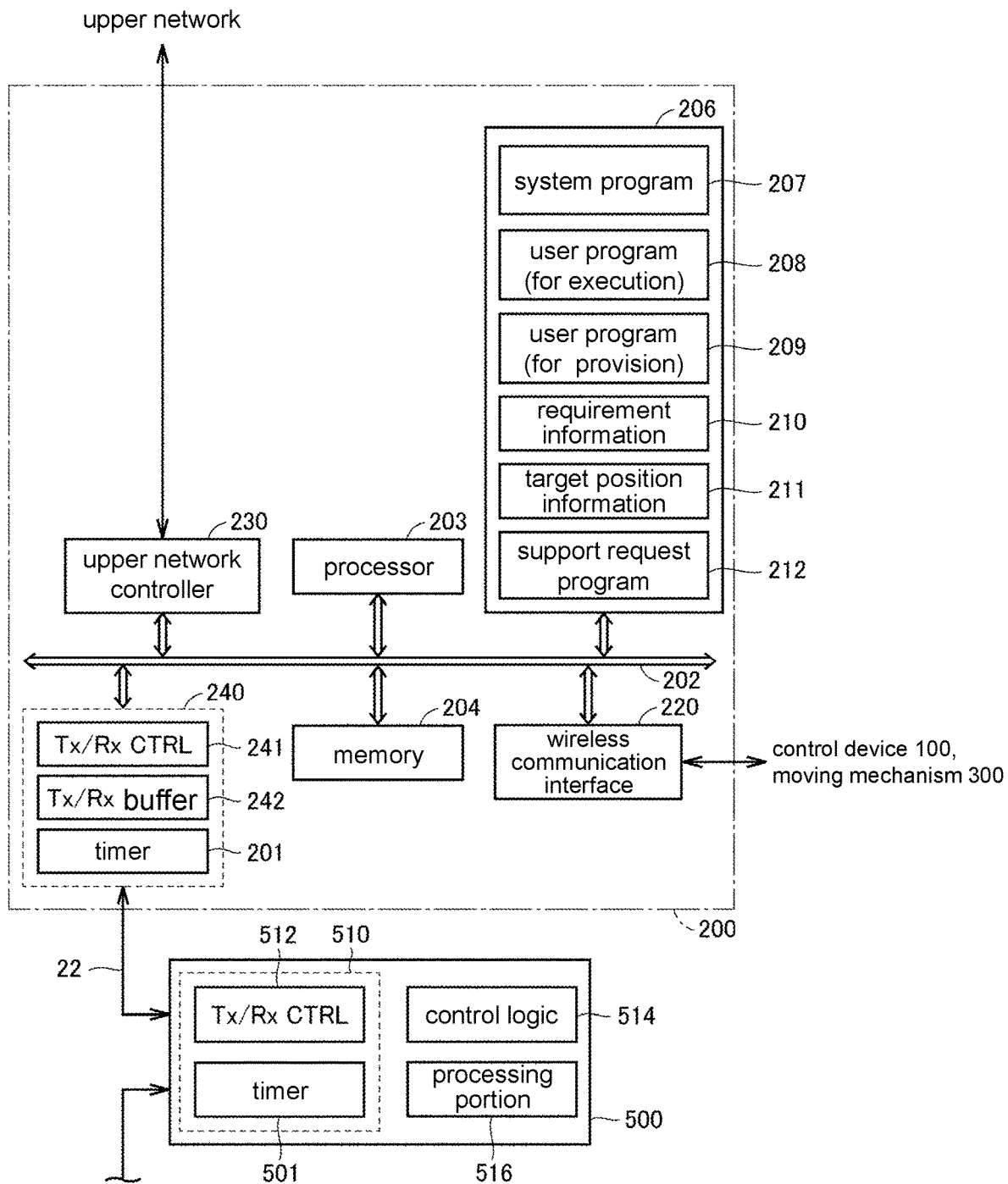
FIG. 4 is a block diagram showing an example of the hardware configurations of a control device and a field machine fixedly installed on a production line.

FIG. 4 is a block diagram showing an example of the hardware configurations of the control device and the field machine fixedly installed on the production line. The control device 200 may typically be configured on the basis of a programmable controller (PLC). The control device 200 is respectively operated as a master that manages data transmission of the field network 22. The field machine 500 is operated as a slave that performs data transmission according to an instruction from the corresponding master.

With reference to FIG. 4, the control device 200 includes, as main components, a processor 203, a memory 204, a storage 206, a wireless communication interface 220, an upper network controller 230, and a field network controller 240. These components included in the control device 200 are communicably connected to each other via internal buses 202.

The processor 203 realizes various kinds of processing by reading and executing a system program 207, a user program 208, and a support request program 212 stored in the storage 206. The memory 104 includes a volatile storage device such as a dynamic random access memory (DRAM), a static random access memory (SRAM), or the like.

The storage 206 stores the user program 208 designed according to an object to be controlled and the like, in addition to the system program 207 for controlling each portion of the control device 200.

Furthermore, the storage 206 stores the user program 209 to be provided to the moving system 10. The user program 209 is an application program (linking user program) which is arbitrarily created to control the field machine 400 included in the moving system 10 so as to operate in linkage with the field machine 500 fixedly installed on the production line. The user program 209 is previously created and stored in the storage 206.

Furthermore, the storage 206 stores requirement information 210. The requirement information 210 is information indicating requirements for operating in linkage with the field machine 500 on the production line on which the control device 200 is installed. The requirement information 210 is previously created and stored in the storage 206. For example, the requirement information 210 is information indicating requirements such as the network configuration of the field machine included in the moving system, the control period of the control device, the capacity of the user program 209 for provision, the model and version information of the control device, the performance and model of the field machine, and the like.

Furthermore, the storage 206 stores target position information 211. The target position information 211 indicates a target position in which the field machine 400 of the moving system 10 is disposed when operating in linkage with the field machine 500. The target position information 211 is previously created and stored in the storage 206.

Furthermore, the storage 206 stores the support request program 212. The support request program 212 is a program for requesting the production support of the moving system 10.

The wireless communication interface 220 controls the exchange of data through the wireless network. The wireless communication interface 220 of the embodiment controls the exchange of data with the control device 200 or the moving mechanism 300 included in the moving system 10.

Moreover, in the control devices 200B and 200D among the control devices 200A to 200D, the storage 206 may not store the user program 209 for provision, the requirement information 210, the target position information 211, and the support request program 212. Furthermore, the control devices 200B and 200D may not include the wireless communication interface 220.

The upper network controller 230 provides an interface for the control device 200 to exchange data with another control device via the network 23. As a protocol of the network 23, EtherNet/IP (registered trademark) may be used which is an industrial open network in which a control protocol is implemented on a general-purpose Ethernet (registered trademark).

The field network controller 240 provides an interface for the control device 200 to exchange data with the field machine 500 via the field network 22. As a protocol of the field network 22, EtherCAT (registered trademark) which is an example of a machine control network may be used.

Similar to the field network controller 140 shown in FIG. 2, the field network controller 240 includes, as main components, a transmission/reception controller 241, a transmission/reception buffer 242, and a timer 201. Because the functions of these components are the same as those of the corresponding components of the field network controller 140 shown in FIG. 2, the detailed descriptions are not repeated.

The field machine 500 performs processing on an object to be controlled such as a mechanism, equipment, or the like according to the control by the control device 200. Typically, the field machine 500 performs collection processing of field information from the object to be controlled, output processing of an instruction signal to the object to be controlled, and the like.

The field machine 500 includes, as main components, a field network controller 510, a control logic 514 for managing data transfer on the field network 22, and a processing portion 516. The field network controller 510 includes, as main components, a transmission/reception controller 512 and a timer 501. The timer 501 takes the timer 201 as a master and is time-synchronized with the timer 201. Because the functions of these components are the same as those of the corresponding components of the field machine 400 shown in FIG. 2, the detailed descriptions are not repeated.

D. Software Configuration/Functional Configuration of Control System

Figure 5:
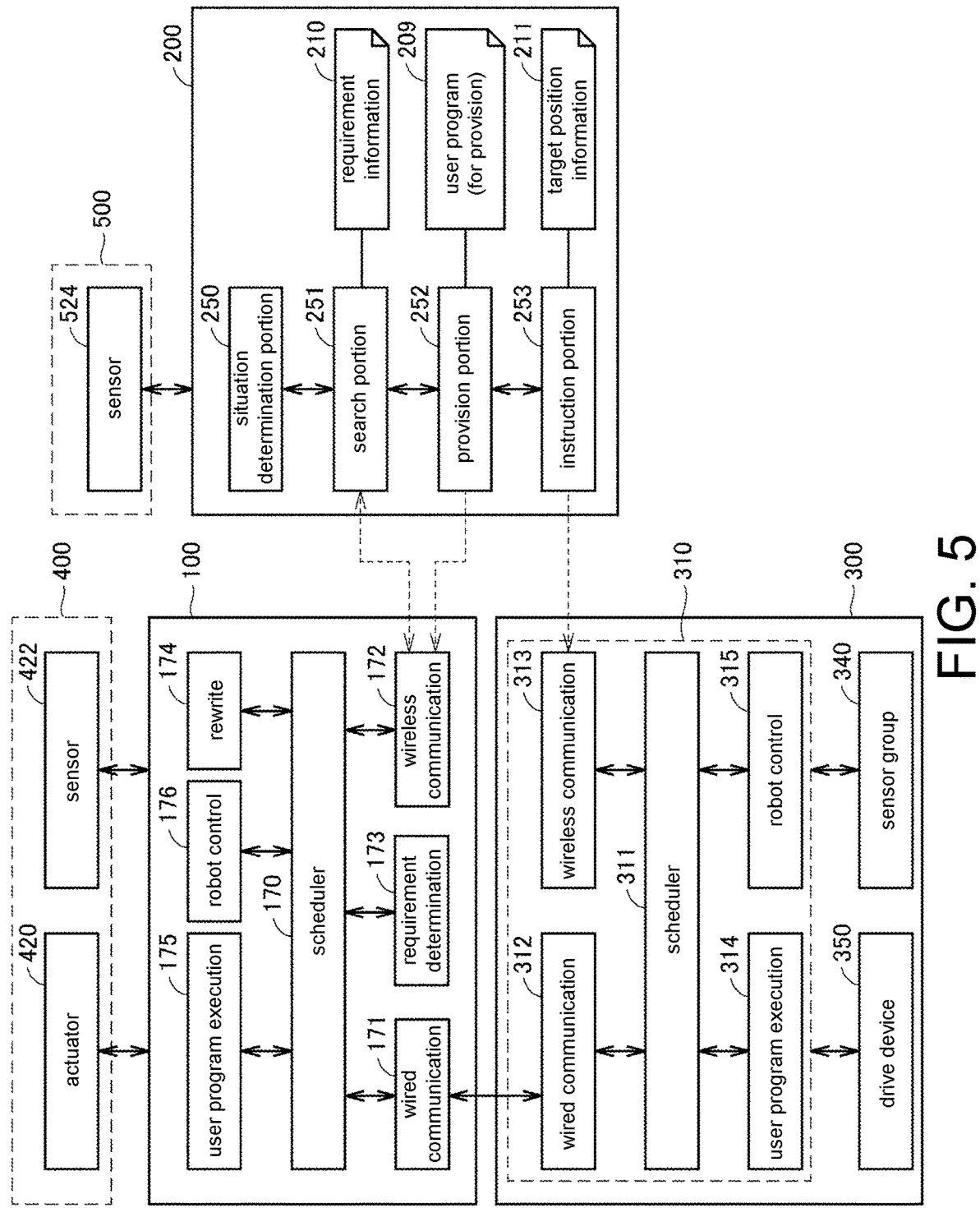
FIG. 5 is a schematic diagram showing an example of the software configuration and the functional configuration of the control system according to the embodiment.

Next, an example of the software configuration and the functional configuration of the control system 1 according to the embodiment is described. FIG. 5 is a schematic diagram showing an example of the software configuration and the functional configuration of the control system according to the embodiment.

(D-1. Functional Configuration of Control Device 200)

With reference to FIG. 5, the control device 200 includes a situation determination portion 250, a search portion 251, a provision portion 252, and an instruction portion 253. The situation determination portion 250, the search portion 251, the provision portion 252, and the instruction portion 253 are realized by the processor 203 of the control device 200 executing the support request program 212 (see FIG. 4).

The control device 200 periodically collects measurement results from a sensor 524 included in the field machine 500. For example, the sensor 524 is a visual sensor, measures the number of unprocessed workpieces by capturing an image of a pallet on the production line and analyzing the captured image, and outputs a measurement result indicating the measured number.

The situation determination portion 250 determines that the production support of the moving system 10 is necessary when the measurement result output from the sensor 524 exceeds a threshold value.

If the situation determination portion 250 determines that the production support of the moving system 10 is necessary, the search portion 251 searches for the moving system 10 which can support the production line among the plurality of moving systems 10A to 10C.

Specifically, the search portion 251 reads the requirement information 210 from the storage 206 (see FIG. 4), and uses the wireless communication interface 120 to deliver a support request command to which the requirement information 210 is added to all the moving systems 10A to 10C. The search portion 251 searches for the moving system 10 which can support the production line based on replies from the moving systems 10A to 10C. That is, the search portion 251 decides the moving system 10 which has transmitted the reply indicating that the support is possible as the moving system for which the production support is requested.

Moreover, when there are a plurality of moving systems 10 that have transmitted the replies indicating that the support is possible, the search portion 251 decides any one of the plurality of moving systems 10 as the moving system for which the production support is requested. Alternatively, the search portion 251 may search for the closest moving system 10 among the plurality of moving systems 10 based on current position information added to the replies.

The provision portion 252 reads the user program 209 for provision from the storage 206 (see FIG. 4). Using the wireless communication interface 120, the provision portion 252 provides the user program 209 to the storage 106 (see FIG. 2) of the control device 100 included in the moving system 10 searched by the search portion 251.

The instruction portion 253 reads the target position information 211 from the storage 206 (see FIG. 4) and generates an instruction for moving to the target position indicated by the target position information 211. Using the wireless communication interface 120, the instruction portion 253 outputs the generated instruction to the moving mechanism 300 included in the moving system 10 searched by the search portion 251.

(D-2. Software Configuration of Control Device 100)

With reference to FIG. 5, a scheduler 170 is executed in the processor 103 (see FIG. 2) of the control device 100. The scheduler 170 decides an execution sequence, an execution interruption, and the like of a plurality of processing according to a preset control period. Specifically, the scheduler 170 allocates processing resources (processor time, memory, and the like) for wired communication processing 171, wireless communication processing 172, requirement determination processing 173, rewrite processing 174, user program execution processing 175, and robot control processing 176 according to a preset priority, a preset control period, and the like.

The wired communication processing 171 includes processing related to data communication with the moving mechanism 300, for example, processing of receiving a movement completion notification from the moving mechanism 300, and the like.

The wireless communication processing 172 includes processing related to data communication with the control device 200, for example, reception processing of the support request command, transmission processing of the reply indicating that the support is possible, reception processing of the user program, completion notification processing of support preparation, and the like.

The requirement determination processing 173 is processing of determining whether or not the requirements indicated by the requirement information added to the support request command are met. The requirement determination processing 173 is executed by comparing the requirement information added to the support request command with the system configuration information 109 (see FIG. 2) stored in the storage 106.

The rewrite processing 174 is processing of rewriting (updating) the user program 108 (see FIG. 2) stored in the storage 106 to the user program provided from the control device 200.

The user program execution processing 175 includes processing related to the execution of the user program 108 (see FIG. 2) stored in the storage 106. The user program execution processing 175 is executed using data collected from a sensor 422 included in the field machine 400, and the like.

The robot control processing 176 includes processing related to the operation control of the field machine 400 which is a robot arm. The robot control processing 176 includes, for example, processing of creating a trajectory plan of the robot arm, processing of obtaining a relationship between the angle of each joint of the robot arm and the position/posture of the front end of the arm (kinematics), control processing of an actuator 420 included in the field machine 400, and the like.

(D-3. Software Configuration of Moving Mechanism 300)

With reference to FIG. 5, the processor 303 (see FIG. 3) of the moving mechanism 300 executes the autonomous traveling program 307, and thereby autonomous traveling processing 310 is performed. The autonomous traveling processing 310 includes a scheduler 311, wired communication processing 312, wireless communication processing 313, user program execution processing 314, and robot control processing 315.

The scheduler 311 is processing of deciding an execution sequence, an execution interruption, and the like of a plurality of processing. Specifically, the scheduler 170 allocates processing resources (processor time, memory, and the like) for the wired communication processing 312, the wireless communication processing 313, the user program execution processing 314, and the robot control processing 315 according to a preset priority, a preset system period, and the like.

The wired communication process 312 includes processing related to data communication with the control device 100, for example, processing of sending a movement completion notification to the control device 100, and the like.

The wireless communication processing 313 includes processing related to data communication with the control device 200, for example, reception processing of a movement instruction to a target position, and the like.

The user program execution processing 314 includes processing related to the execution of a user program (not shown) stored in the storage 306.

The robot control processing 315 includes processing related to the movement of the moving mechanism 300. The robot control processing 315 includes, for example, processing of confirming the situation of the surrounding environment based on the measurement result from the sensor group 340 (for example, confirmation processing of the position of an obstacle), decision processing of a movement route from the current position to the target position, control processing of the actuator included in the drive device 350, and the like.

E. Recombination Processing of Field Machine

Figure 6:
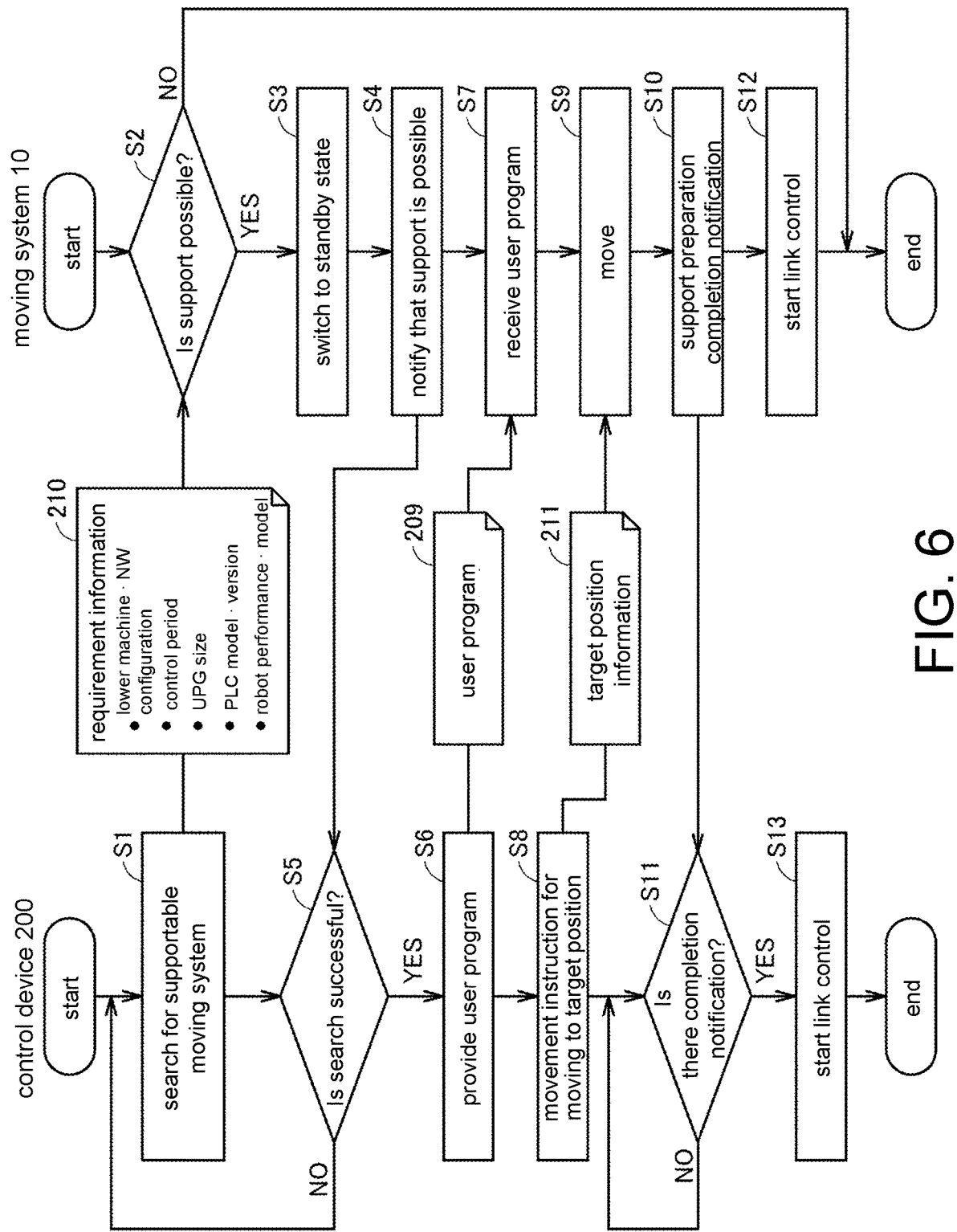
FIG. 6 is a flowchart showing the flow of dynamic recombination processing of the field machine according to the embodiment.

Next, the procedure of dynamic recombination processing of the field machine included in the moving system 10 is described. FIG. 6 is a flowchart showing the flow of the dynamic recombination processing of the field machine according to the embodiment.

Firstly, in the control device 200, if the processor 203 determines that the production support of the moving system 10 is necessary, the processor 203 searches for the moving system 10 which can support the production line among the plurality of moving systems 10 (step S1). The processor 203 delivers the support request command to which the requirement information 210 is added to all the moving systems 10.

The processor 103 of the control device 100 included in each of the moving systems 10 determines whether or not the support is possible (step S2). The processor 103 determines that the support is possible when the following two conditions (a) and (b) are met.

(a) The contents of the system configuration information 109 stored in the storage 106 meet the requirements indicated by the requirement information 210 added to the support request command.

(b) Currently not at work.

If it is determined that the support is impossible (NO in step S2), the dynamic recombination processing of the field machine is terminated.

If it is determined that the support is possible (YES in step S2), the processor 103 switches the control device 100 to a standby state (step S3), and notifies a reply indicating that the support is possible to the control device 200 of a transmission destination of the support request command (Step S4). At this time, the processor 103 acquires the current position information from the moving mechanism 300 and adds the acquired current position information to the reply.

The processor 203 of the control device 200 determines whether or not the search for the supportable moving system 10 is successful (step S5). Specifically, when receiving the reply indicating that the support is possible, the processor 203 determines that the search for the supportable moving system 10 is successful. When the search for the supportable moving system 10 fails (NO in step S5), the processing returns to step S1.

When the search for the supportable moving system 10 is successful (YES in step S5), the processor 203 provides the user program 209 to the control device 100 of the searched moving system 10 (step S6).

The control device 100 of the moving system 10 receives the user program 209 (step S7). The processor 103 of the control device 100 updates the user program 108 stored in the storage 106 to the received user program 209.

Next, the processor 203 of the control device 200 outputs, to the moving mechanism 300 of the searched moving system 10, an instruction (movement instruction) for moving to the target position indicated by the target position information 211 (step S8). The moving mechanism 300 of the moving system 10 receives the movement instruction and moves to the target position according to the movement instruction (step S9).

If the processor 103 of the control device 100 of the moving system receives the movement completion notification from the moving mechanism 300 to the target position, the processor 103 outputs the support preparation completion notification to the control device 200 (step S10). Then, as well in the control device 100, the processor 103 starts to control the field machine 400 to operate in linkage with the field machine 500 (step S12).

The processor 203 of the control device 200 determines whether or not there is a support preparation completion notification (step S11). When no support preparation completion notification is received (NO in step S11), the processing returns to step S11.

When receiving the support preparation completion notification (YES in step S11), the processor 203 of the control device 200 starts to control the field machine 500 to operate in linkage with the field machine 400 of the moving system 10 (step S13). After steps S12 and S13, the dynamic recombination processing of the field machine is completed.

F. Action/Effect

As described above, the control system 1 according to the embodiment includes the control device 100 that controls the field machine 500, and the one or more moving systems 10. Each moving system 10 includes the field machine 400, the moving mechanism 300 which moves the field machine 400, and the control device 100 for controlling the field machine 400. The control device 100 has the storage 106 for storing the user program for controlling the field machine 400, and the processor 103 for executing the user program 108 stored in the storage 106. The processor 203 of the control device 200 searches for the moving system 10 that meets the preset requirement information among the one or more moving systems 10. Furthermore, the processor 103 outputs, to the moving mechanism 300 included in the searched moving system 10, an instruction for moving the field machine 400 included in the searched moving system 10 to a position operable in linkage with the field machine 500. Furthermore, the processor 103 provides, to the storage 106 of the control device 100 included in the searched moving system 10, the user program 209 (linking user program) for controlling the field machine 400 to operate in linkage with the field machine 500.

In this way, the movement instruction is automatically output to the moving mechanism 300 included in the searched moving system 10, and the user program 209 is automatically provided to the control device 100 included in the moving system 10. Accordingly, the time and effort of the user when dynamically recombining the field machine 400 included in the moving system 10 is reduced, and the dynamic recombination of the field machine is efficiently performed.

G. Variation Example 1

The user program 209 provided from the control device 200 to the control device 100 may include a command for the control device 100 to connect to the control device 200 via the network 23 (the network 23A or the network 23B (see FIG. 1)). Accordingly, the network 23 can build data links among the control device 100, the control device 200, and the management device 190. According to the data links, the management device 190 can enhance the linkage between the control device 100 and the control device 200.

H. Variation Example 2

The processor 103 of the control device 100 included in the searched moving system 10 may adjust the timer 101 of the processor 103 itself to be time-synchronized with the timer 201 of the control device 200. Accordingly, the operation of the field machine 400A and the operation of the field machine 500A can be synchronized.

I. Variation Example 3

In the above descriptions, it is assumed that from the control device 200 requesting the production support to the moving system 10, the movement instruction is output, and the user program 209 is provided. However, the movement instruction may be output and the user program 209 may be provided from the server device capable of communicating with the moving system. In this case, the storage 206 of the control device 200 may not store the user program 209 for provision and the target position information 211.

Figure 7:
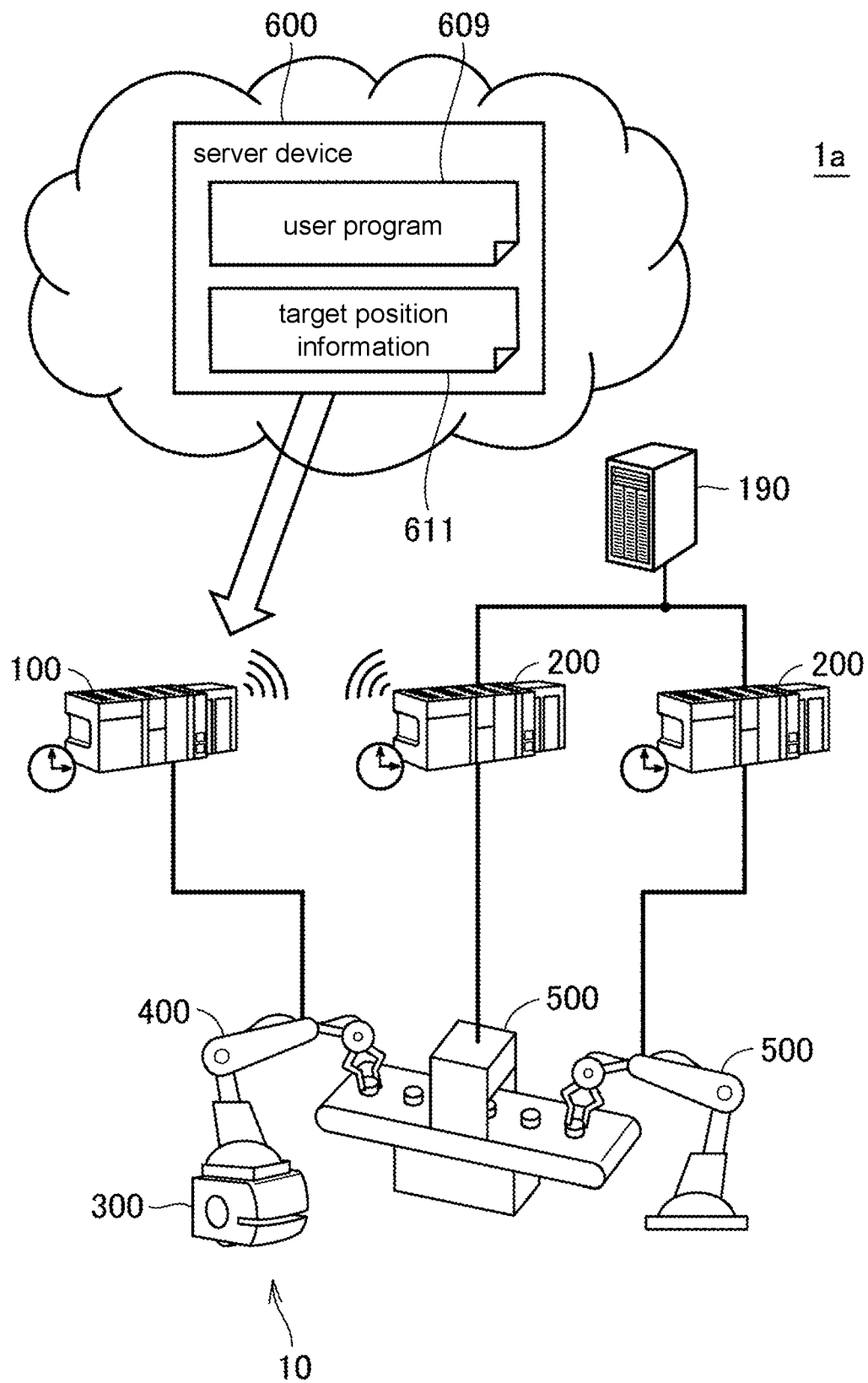
FIG. 7 is a diagram schematically showing an outline of a control system according to Variation example 3.

FIG. 7 is a diagram schematically showing an outline of a control system according to Variation example 3. With reference to FIG. 7, a control system 1a according to Variation example 3 further includes a server device 600 disposed in a cloud computing system. The server device 600 can communicate with the moving system 10. The server device 600 outputs a movement instruction to the moving mechanism 300 of the moving system 10. The movement instruction is an instruction for moving to a target position indicated by target position information 611 stored in the server device 600. Furthermore, the server device 600 provides a user program 609 to the control device 100 of the moving system 10.

Figure 8:
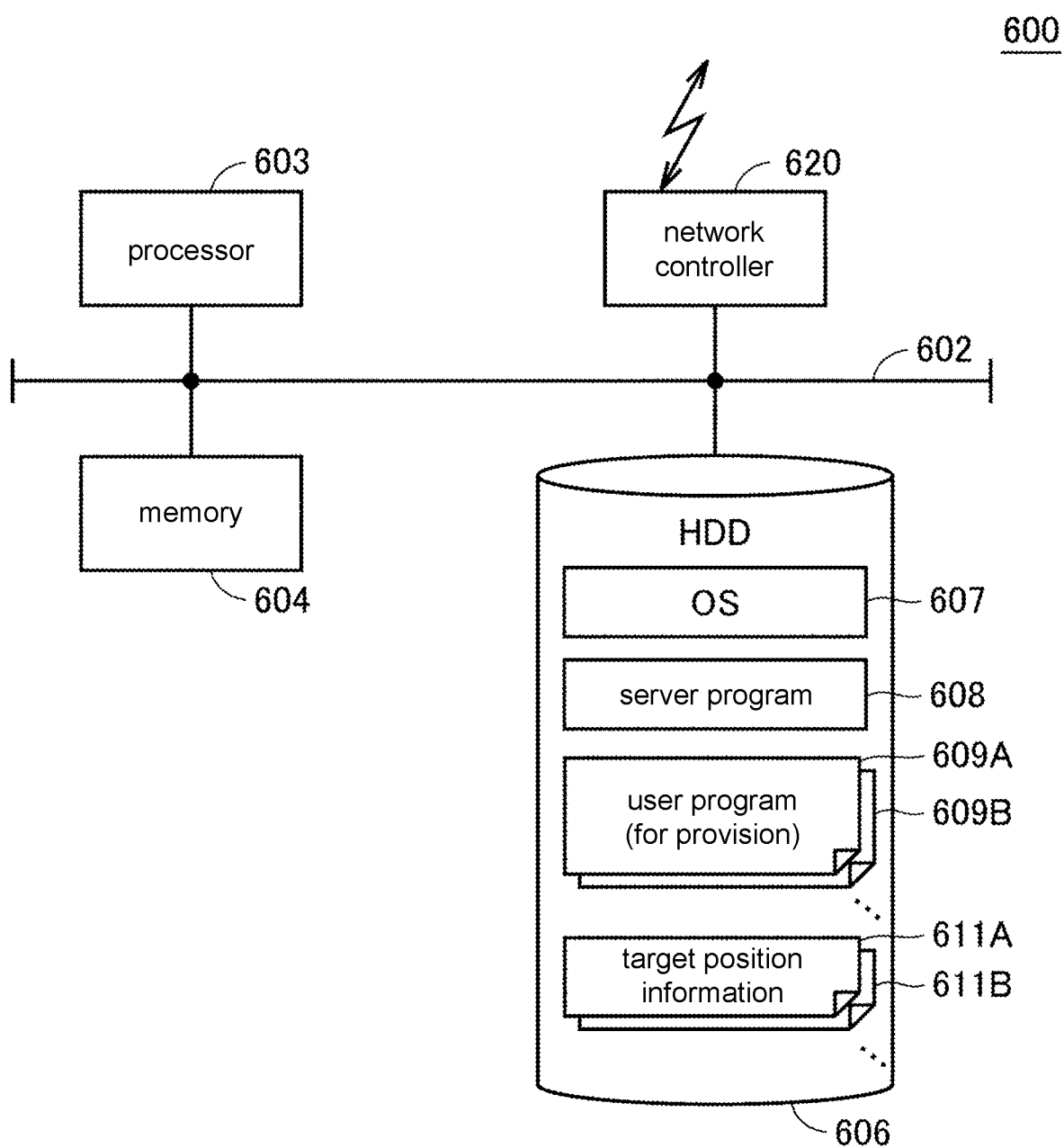
FIG. 8 is a block diagram showing an example of the hardware configuration of a server device according to Variation example 3.

FIG. 8 is a block diagram showing an example of the hardware configuration of the server device according to Variation example 3. The server device 600 includes: a processor 603 such as a CPU, a MPU, or the like; a memory 604; a hard disk (HDD) 606; and a network controller 620 for exchanging data with another device. These components are connected to each other via internal buses 602 so as to be capable of data communication.

The hard disk 606 stores an operating system (OS) 607 for providing an execution environment of a basic program in the server device 600, and a server program 608 which outputs information to the moving system 10. These programs are read into the memory 604 and executed by the processor 603.

Furthermore, the hard disk 606 stores a user program for controlling the field machine 400 of the moving system 10 to operate in linkage with the field machine 500 fixedly installed on each production line. A user program 609A corresponds to the production line 2A (see FIG. 1) and is provided to the control device 100 of the moving system 10 that supports the production line 2A. A user program 609B corresponds to the production line 2B (see FIG. 1) and is provided to the control device 100 of the moving system 10 that supports the production line 2B.

Furthermore, the hard disk 606 stores target position information indicating a target position in which the field machine 400 of the moving system 10 is disposed when operating in linkage with the field machine 500 fixedly installed on each production line. Target position information 611A corresponds to the production line 2A (see FIG. 1) and indicates the target position in which the field machine 400 of the moving system 10 that supports the production line 2A is disposed. Target position information 611B corresponds to the production line 2B (see FIG. 1) and indicates the target position in which the field machine 400 of the moving system 10 that supports the production line 2B is disposed.

Figure 9:
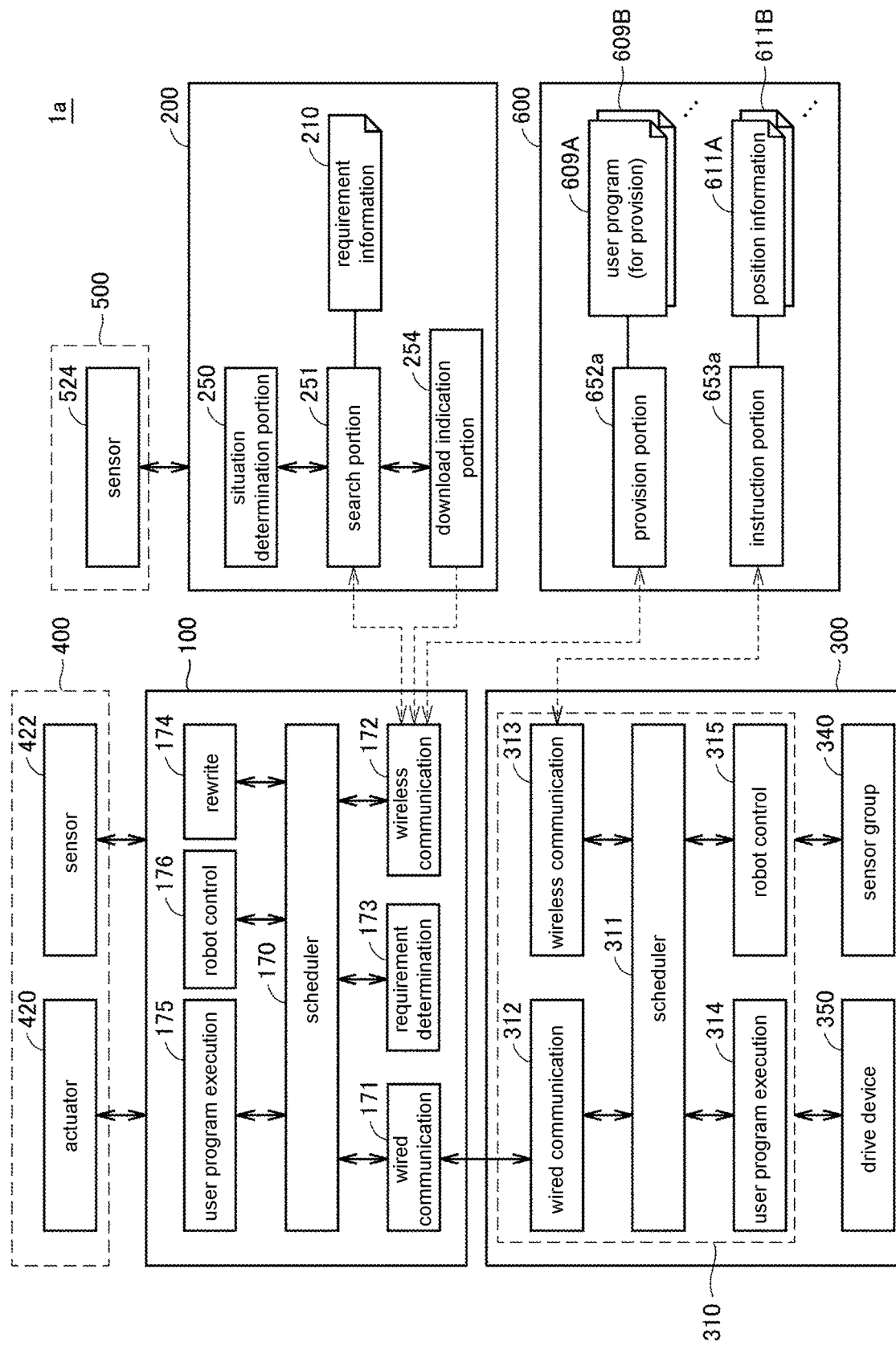
FIG. 9 is a schematic diagram showing an example of the software configuration and the functional configuration of the control system according to Variation example 3.

FIG. 9 is a schematic diagram showing an example of the software configuration and the functional configuration of the control system according to Variation example 3. With reference to FIG. 9, the control device 200 is different from the mechanism configuration shown in FIG. 5 in that the control device 200 includes a download indication portion 254 instead of the provision portion 252 and the instruction portion 253. The download indication portion 254 is realized by the processor 203 of the control device 200 executing the support request program 212 (see FIG. 4).

The download indication portion 254 outputs, to the control device 100 included in the moving system 10 searched by the search portion 251, a download indication of the user program and the target position. The download indication portion 254 outputs the download indication to which a program ID and a position ID are added, wherein the program ID identifies the user program corresponding to the production line on which the field machine 500 is fixedly installed, and the position ID identifies the target position information.

The wireless communication processing 172 executed by the control device 100 of the control system 1a according to Variation example 3 includes: reception processing of the above download indication; processing of requesting the user program identified by the program ID added to the download indication from the server device 600; and processing of downloading the user program from the server device 600.

Furthermore, the wired communication processing 171 executed by the control device 100 includes processing of outputting, to the moving mechanism 300, the position ID added to the download indication.

The wired communication processing 312 executed by the moving mechanism 300 of the control system 1a according to Variation example 3 includes reception processing of the position ID.

Furthermore, the wireless communication processing 313 executed by the moving mechanism 300 includes: processing of transmitting a request for the movement instruction to the server device 600, and processing of receiving the movement instruction from the server device 600. The position ID received in the wired communication processing 312 is added to the request for the movement instruction.

The server device 600 includes a provision portion 652a and an instruction portion 653a. The provision portion 652a and the instruction portion 653a are realized by the processor 603 of the server device 600 executing the server program 608 (see FIG. 8).

If the provision portion 652a receives the request for the user program identified by the program ID from the control device 100, the provision portion 652a reads the user program corresponding to the program ID among the user programs 609A, 609B . . . stored in the hard disk 606 (see FIG. 8). The provision portion 652a provides the read user program to the control device 100 by using the network controller 620.

If the instruction portion 653a receives the request for the movement instruction from the moving mechanism 300, the instruction portion 653a reads the target position information corresponding to the position ID added to the movement instruction among the target position information 611A, 611B . . . stored in a storage 506 (see FIG. 8). The instruction portion 653a generates an instruction (movement instruction) for moving to the target position indicated by the read target position information. The instruction portion 653a outputs the generated movement instruction to the moving mechanism 300 by using the network controller 620.

Figure 10:
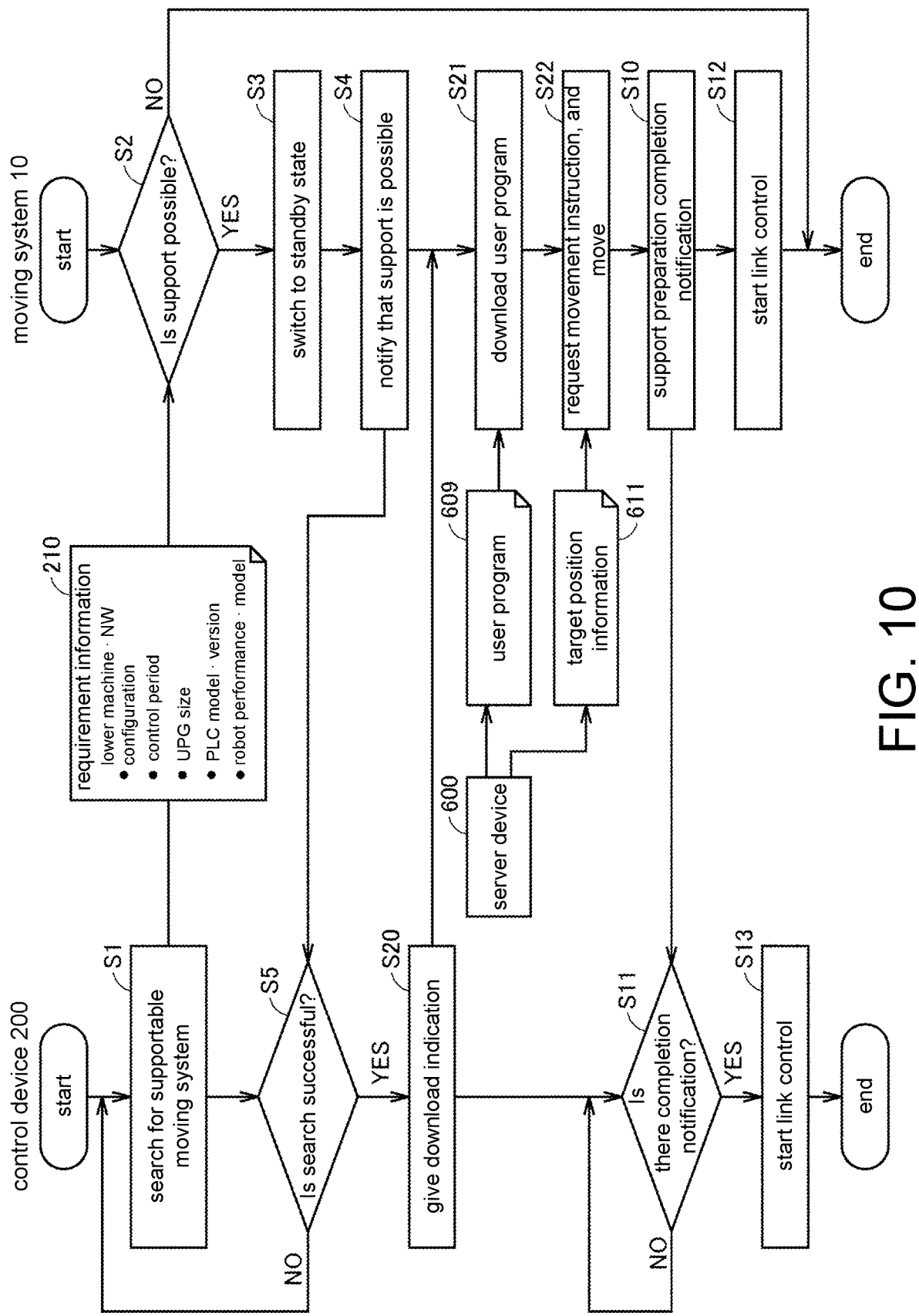
FIG. 10 is a flowchart showing the flow of dynamic recombination processing of a field machine according to Variation example 3.

FIG. 10 is a flowchart showing the flow of dynamic recombination processing of the field machine according to Variation example 3. The flowchart shown in FIG. 10 is different from the flowchart shown in FIG. 6 in that steps S20 to S22 are included instead of steps S6 to S9. Therefore, steps S20 to S22 are described.

When the search for the supportable moving system 10 is successful (YES in step S5), the processor 203 of the control device 200 transmits a download indication to the control device 100 of the searched moving system 10 (step S20). A program ID and a position ID are added to the download indication.

The processor 103 of the control device 100 of the moving system 10 downloads the user program identified by the program ID (step S21). Specifically, the processor 103 requests the user program 609 identified by the program ID from the server device 600. The processor 603 of the server device 600 provides the requested user program 609.

Furthermore, the processor 103 of the control device 100 of the moving system 10 outputs the position ID to the moving mechanism 300. Then, the moving mechanism 300 requests a movement instruction from the server device 600, and moves according to the movement instruction received from the server device 600 (step S22). Specifically, the processor 303 of the moving mechanism 300 transmits the request to which the position ID is added to the server device 600. The processor 603 of the server device 600 generates an instruction (movement instruction) for moving to the target position indicated by the target position information corresponding to the position ID, and outputs the generated movement instruction to the moving mechanism 300.

According to Variation example 3, the control device 200 does not need to store the user program to be provided to the moving system 10. Therefore, the storage 206 of the control device 200 can be effectively used.

J. Variation Example 4

A control system 1b according to Variation example 4 is a further variation example of the control system 1a according to Variation example 3. The hardware configuration of the control system 1b according to Variation example 4 is almost the same as the hardware configuration of the control system 1a according to Variation example 3. Therefore, detailed descriptions of the hardware configuration are omitted.

Figure 11:
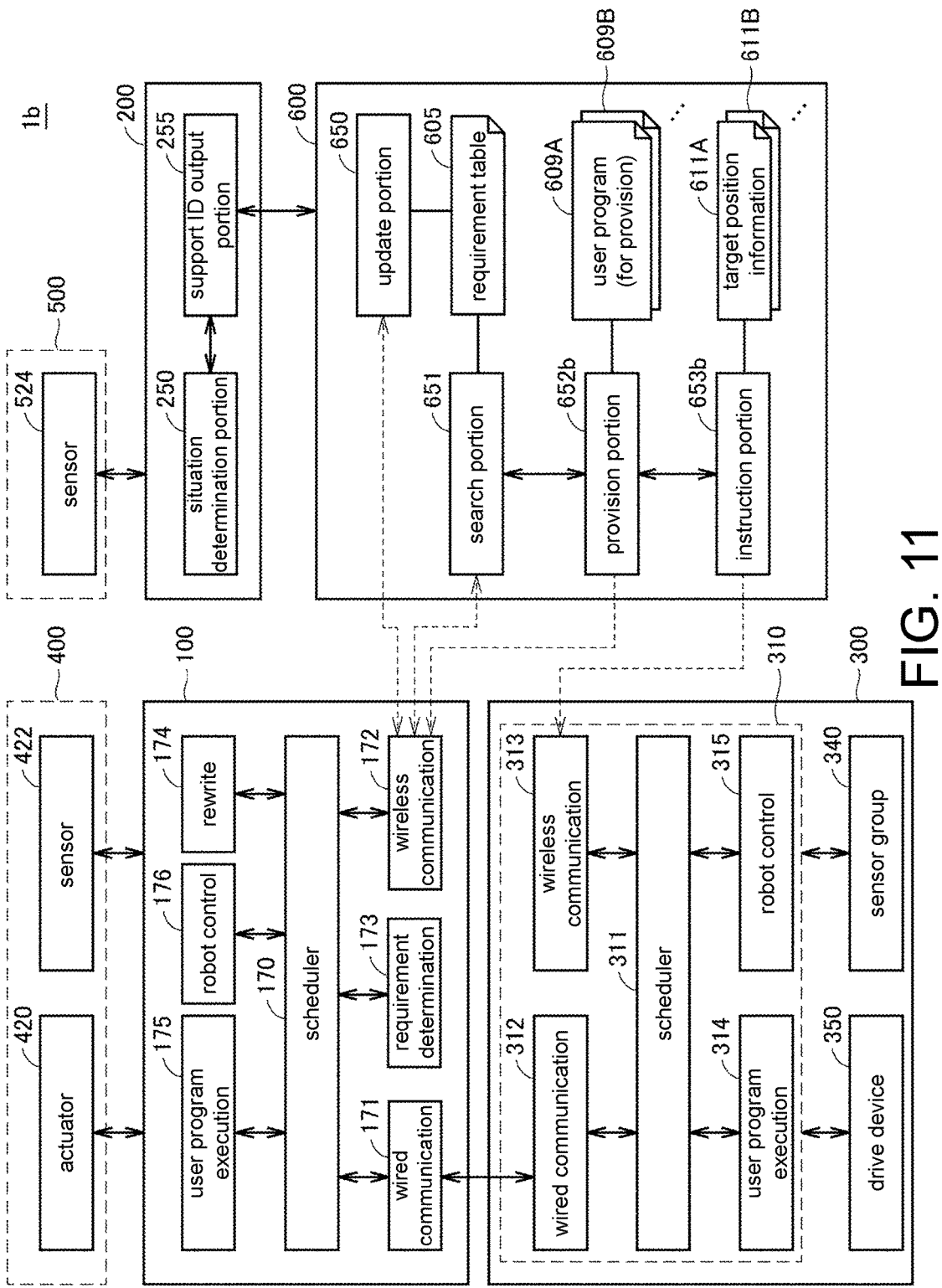
FIG. 11 is a schematic diagram showing an example of the software configuration and the functional configuration of a control system according to Variation example 4.

FIG. 11 is a schematic diagram showing an example of the software configuration and the functional configuration of the control system according to Variation example 4. With reference to FIG. 11, the control device 200 of the control system 1b is different from the mechanism configuration shown in FIG. 5 in that the control device 200 includes a support ID output portion 255 instead of the search portion 251, the provision portion 252, and the instruction portion 253. The support ID output portion 255 is realized by the processor 203 shown in FIG. 4 executing the support request program 212.

If the situation determination portion 250 determines that the production support of the moving system 10 is necessary, the support ID output portion 255 outputs, to the server device 600, a support ID that identifies the production line and the work content for which the production support is necessary.

The server device 600 includes an update portion 650, a search portion 651, a provision portion 652b, and an instruction portion 653b. The update portion 650, the search portion 651, the provision portion 652b, and the instruction portion 653b are realized by the processor 603 of the server device 600 executing the server program 608 (see FIG. 8).

In addition, in the hard disk 606 of the server device 600, a requirement table 605 is previously stored in addition to the user programs 609A, 609B . . . for provision and the target position information 611A, 611B . . .

FIG. 12 is a diagram showing an example of the requirement table stored by the server device according to Variation example 4. With reference to FIG. 12, the requirement table 605 is a table in which, for each moving system 10, information indicating the current state (at work or under suspension) of the moving system (hereinafter referred to as "state information") and information indicating whether or not the moving system meets the requirement information corresponding to the support ID (hereinafter referred to as "requirement availability information") are associated. In the requirement table 605 of the example shown in FIG. 12, "support 01", "support 02", "support 03", and "support 04" are support IDs. The requirement table 605 of the example shown in FIG. 12 shows that the system configuration of the moving system 10A meets the requirements which are requested for the moving system to perform the support of the support IDs "support 01" and "support 03".

In addition, each of the user programs 609A, 609B . . . is associated with the support ID. That is, each support ID is associated with the user program for controlling the field machine 400 so as to perform the support of the support ID.

Furthermore, each piece of the target position information 611A, 611B . . . is associated with the support ID. That is, each support ID is associated with the target position information indicating a target position in which the field machine 400 for performing the support of the support ID is disposed.

Returning to FIG. 11, the update portion 650 updates the requirement table 605. The update portion 650 periodically receives a notification of the current work state from the control device 100 of each moving system 10. The notification of the work state is a notification of information indicating whether the system is at work or under suspension. The update portion 650 updates the state information of the requirement table 605 based on the notification.

Moreover, when the system configuration of the moving system 10 is changed, the update portion 650 may appropriately update the requirement availability information based on the changed system configuration.

If the search portion 651 receives the support ID from the control device 200, the search portion 651 searches for the moving system 10 which can support the production line among the plurality of moving systems 10. Specifically, with reference to the requirement table 605, the search portion 651 searches for the moving system in which the requirement availability information corresponding to the received support ID indicates "meet" and the state information indicates "under suspension". The search portion 651 decides the searched moving system 10 as the moving system for which the production support is requested.

Moreover, when a plurality of moving systems 10 are searched, the search portion 651 may decide any one of the plurality of moving systems 10 as the moving system for which the production support is requested. Alternatively, the server device 600 may manage the current position of each moving system 10, and based on the current position, search for the moving system 10 among the plurality of moving systems 10 that is the closest to the production line to which the control device 200 outputting the support ID belongs.

The provision portion 652b reads the user program corresponding to the support ID among the user programs 609A, 609B . . . stored in the hard disk 606 (see FIG. 8). The provision portion 652b provides the read user program to the control device 100 of the searched moving system 10 by using the network controller 620.

The instruction portion 653b reads the target position information corresponding to the support ID among the target position information 611A, 611B . . . stored in the storage 206 (see FIG. 4). The instruction portion 653b generates an instruction for moving to the target position indicated by the read target position information. The instruction portion 653b outputs the generated instruction to the moving mechanism 300 of the searched moving system 10 by using the network controller 620.

Figure 13:
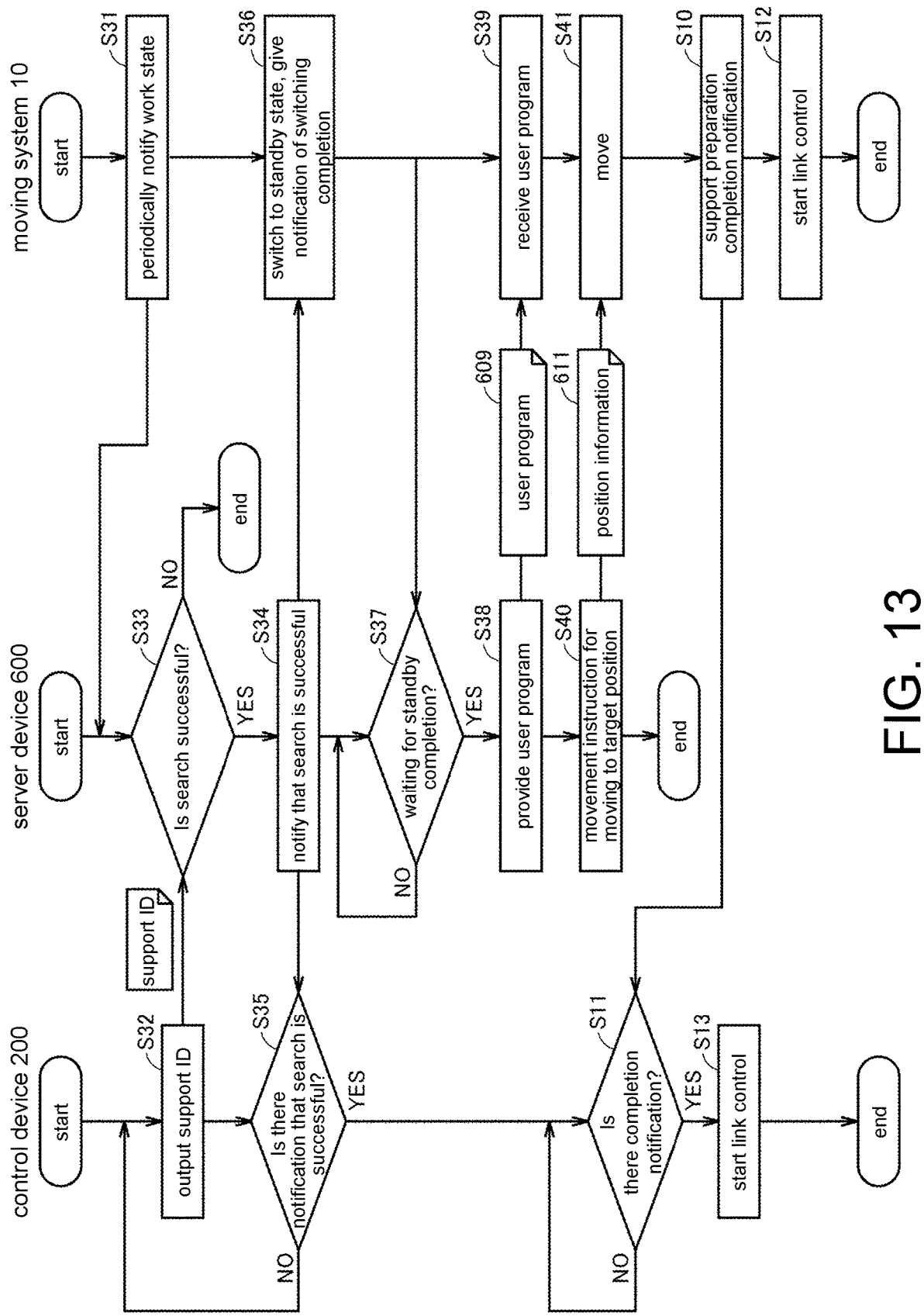
FIG. 13 is a flowchart showing the flow of dynamic recombination processing of a field machine according to Variation example 4.

Next, the procedure of the dynamic recombination processing of the field machine according to Variation example 4 is described. FIG. 13 is a flowchart showing the flow of the dynamic recombination processing of the field machine according to Variation example 4.

Firstly, the processor 103 of the control device 100 periodically notifies the server device 600 of the work state (step S31). Accordingly, the requirement table 605 of the server device 600 is appropriately updated.

In the control device 200, if the processor 203 determines that the production support of the moving system 10 is necessary, the processor 203 outputs the support ID to the server device 600 (step S32).

With reference to the requirement table 605, the processor 603 of the server device 600 determines whether or not the search for the moving system 10 capable of the support indicated by the support ID is successful (step S33). When the search for the supportable moving system 10 fails (NO in step S33), the processing is terminated.

When the search for the supportable moving system 10 is successful (YES in step S33), the processor 603 notifies that the search for the moving system 10 is successful (step S34). The notification destinations in step S34 are the control device 200 that transmits the support ID and the control device 100 of the searched moving system 10.

The processor 203 of the control device 200 determines whether or not there is a notification that the search is successful (step S35). When the notification that the search is successful is not received (NO in step S35), the processing returns to step S32. When the notification that the search is successful is received (YES in step S35), the processor 203 performs the processing of step S11.

Meanwhile, the processor 103 of the control device 100 of the moving system 10 switches the control device 100 to the standby state, and notifies the server device 600 of the completion of switching to the standby state (step S36).

The processor 603 of the server device 600 determines whether or not the notification of the completion of switching to the standby state is received (step S37). When the notification of the completion of switching to the standby state is not received (NO in step S37), the processing returns to step S37.

When the notification of the completion of switching to the standby state is received (YES in step S37), the processor 603 provides the user program 609 corresponding to the support ID to the control device 100 of the searched moving system 10 (step S38).

The control device 100 of the moving system 10 receives the user program 609 (step S39). The processor 103 of the control device 100 updates the user program 108 stored in the storage 106 to the provided user program 609.

Next, the processor 603 of the server device 600 outputs, to the moving mechanism 300 of the searched moving system 10, an instruction for moving to the target position indicated by the target position information corresponding to the support ID (step S40). The moving mechanism 300 of the moving system 10 receives the instruction and moves to the target position according to the instruction (step S41). Thereafter, the pieces of processing of steps S10 to S13 shown in FIG. 6 are performed, and the processing is terminated.

K. Additions

As described above, the embodiment includes the following disclosure.

(Configuration 1)

A control system (1, 1a, 1b), including:
a first control device (200, 200A, 200C) for controlling a first machine to be controlled (500, 500A, 500C), and one or more moving systems (10, 10A to 10C); wherein
each of the one or more moving systems (10, 10A to 10C) includes:
a second machine to be controlled (400, 400A to 400C),
a moving mechanism (300, 300A to 300C) which moves the second machine to be controlled (400, 400A to 400C), and
a second control device (100, 100A to 100C) for controlling the second machine to be controlled (400, 400A to 400C);
the second control device (100, 100A to 100C) has:
a storage part (106) for storing a user program for controlling the second machine to be controlled (400, 400A to 400C), and
a calculation part (103) for executing the user program stored by the storage part (106); and
the control system (1, 1a, 1b) further includes:
a search part (203, 251, 603, 651) that searches, among the one or more moving systems (10, 10A to 10C), for the moving system (10, 10A to 10C) that meets preset requirements;
an instruction part (203, 253, 603, 653, 653a) that outputs, to the moving mechanism (300, 300A to 300C) included in the searched moving system (10, 10A to 10C), an instruction for moving the second machine to be controlled (400, 400A to 400C) included in the moving system (10, 10A to 10C) searched by the search part (203, 251, 651) to a position operable in linkage with the first machine to be controlled (500, 500A, 500C); and a provision part (203, 252, 603, 652, 652a) that provides, to the storage part (106) of the second control device (100, 100A to 100C) included in the searched moving system (10, 10A to 10C), a linking user program for controlling the second machine to be controlled (400, 400A to 400C) to operate in linkage with the first machine to be controlled (500, 500A, 500C).

(Configuration 2)

The control system (1, 1a, 1b) according to configuration 1, wherein the linking user program includes a command for the second control device (100, 100A to 100C) to connect to the first control device (200, 200A, 200C) via a network.

(Configuration 3)

The control system (1, 1a, 1b) according to configuration 1, wherein the first control device (200, 200A, 200C) has a first timer (201) which is time-synchronized with the first machine to be controlled (500, 500A, 500C), and
the second control device (100, 100A to 100C) further has:
a second timer (101) which is time-synchronized with the second machine to be controlled (400, 400A to 400C), and
an adjustment part (103) which adjusts the second timer (101) to be time-synchronized with the first timer (201) when the linking user program is provided to the storage part (106) from the provision part (203, 252, 603, 652, 652a).

(Configuration 4)

The control system (1) according to configuration 1, wherein the search part (203, 251), the instruction part (203, 253), and the provision part (203, 252) are included in the first control device (200, 200A, 200C).

(Configuration 5)

The control system (1a, 1b) according to configuration 1, further including a server device (600) capable of communicating with the moving system (10, 10A to 10C), wherein the instruction part (603, 653, 653a) and the provision part (603, 652, 652a) are included in the server device (600).

(Configuration 6)

A control method of a control system (1, 1a, 1b), wherein the control system (1, 1a, 1b) includes:
a first control device (200, 200A, 200C) which controls a first machine to be controlled (500, 500A, 500C), and one or more moving systems (10, 10A to 10C);
each of the one or more moving systems (10, 10A to 10C) includes:
a second machine to be controlled (400, 400A to 400C),
a moving mechanism (300, 300A to 300C) which moves the second machine to be controlled (400, 400A to 400C), and
a second control device (100, 100A to 100C) for controlling the second machine to be controlled (400, 400A to 400C);
the second control device (100, 100A to 100C) has:
a storage part (106) for storing a user program for controlling the second machine to be controlled (400, 400A to 400C), and
a calculation part (103) for executing the user program stored by the storage part (106); and
the control method includes:
a step of searching, among the one or more moving systems (10, 10A to 10C), for the moving system (10, 10A to 10C) that meets preset conditions;
a step of outputting, to the moving mechanism (300, 300A to 300C) included in the searched moving system (10, 10A to 10C), an instruction for moving the second machine to be controlled (400, 400A to 400C) included in the searched moving system (10, 10A to 10C) to a position operable in linkage with the first machine to be controlled (500, 500A, 500C); and a step of providing, to the storage part (106) of the second control device (100, 100A to 100C) included in the searched moving system (10, 10A to 10C), a linking user program for controlling the second machine to be controlled (400, 400A to 400C) to operate in linkage with the first machine to be controlled (500, 500A, 500C).

The embodiments of the present invention have been described, but it should be considered that the embodiments disclosed this time are exemplary in all respects and not limited hereto. The scope of the present invention is indicated by the claims and is intended to include meanings equivalent to the claims and all modifications within the scope.

What is claimed is:

1. A control system, comprising:
   a first processor for controlling a first machine to be controlled; and
   one or more moving systems, wherein each of the one or more moving systems comprises:
   a second machine to be controlled;
   a moving robot which moves the second machine to be controlled;
   a second processor for controlling the second machine to be controlled; and
   a memory for storing a user program for controlling the second machine to be controlled,
   wherein the second processor is configured to:
   execute the user program stored by the memory;
   wherein the first processor is configured to:
   search, among the one or more moving systems, for the moving system that meets preset requirements comprising:
   delivering a support request to which requirement information comprising hardware and software requirements to perform the support is added to the one or more moving systems, wherein each of the one or more moving systems determines whether the support is possible according to the requirement information added to the support request, and wherein a first moving system among the one or more moving systems notifies a reply indicating that the support is possible;
   receiving a reply notified by a first moving system among the one or more moving systems and indicating that the support is possible; and
   determining that the first moving system is the searched moving system;
   output, to the moving robot included in the searched moving system, an instruction for moving the second machine to be controlled included in the searched moving system to a position operable in linkage with the first machine to be controlled; and
   provide, to the memory of the second processor included in the searched moving system, a linking user program for controlling the second machine to be controlled to operate in linkage with the first machine to be controlled.

2. The control system according to claim 1, wherein the linking user program comprises a command for the second processor to connect to the first processor via a network.

3. The control system according to claim 1, wherein the first processor has a first timer which is time-synchronized with the first machine to be controlled, and
   the second processor further has:
   a second timer which is time-synchronized with the second machine to be controlled,
   wherein the second processor is further configured to:
   adjust the second timer to be time-synchronized with the first timer when the linking user program is provided to the memory first processor.

4. The control system according to claim 1, further comprising a server device capable of communicating with the moving system, wherein
   the first processor is included in the server device.

5. A control method of a control system, wherein
   the control system comprises:
   a first processor which controls a first machine to be controlled; and
   one or more moving systems, wherein each of the one or more moving systems comprises:
   a second machine to be controlled;
   a moving robot which moves the second machine to be controlled;
   a second processor for controlling the second machine to be controlled; and
   a memory for storing a user program for controlling the second machine to be controlled,
   wherein the second processor is configured to:
   execute the user program stored by the memory;
   the control method comprises:
   searching, among the one or more moving systems, for the moving system that meets preset conditions comprising:
   delivering a support request to which requirement information comprising hardware and software requirements to perform the support is added to the one or more moving systems, wherein each of the one or more moving systems determines whether the support is possible according to the requirement information added to the support request, and wherein a first moving system among the one or more moving systems notifies a reply indicating that the support is possible;
   receiving a reply notified by a first moving system among the one or more moving systems and indicating that the support is possible; and
   determining that the first moving system is the searched moving system;
   outputting, to the moving robot, an instruction for moving the second machine to be controlled included in the searched moving system to a position operable in linkage with the first machine to be controlled; and
   providing, to the memory of the second processor included in the searched moving system, a linking user program for controlling the second machine to be controlled to operate in linkage with the first machine to be controlled.

* * * * *